(12) United States Patent
Vorontsov et al.

(10) Patent No.: US 6,911,637 B1
(45) Date of Patent: Jun. 28, 2005

(54) WAVEFRONT PHASE SENSORS USING OPTICALLY OR ELECTRICALLY CONTROLLED PHASE SPATIAL LIGHT MODULATORS

(75) Inventors: Mikhail A. Vorontsov, Laurel, MD (US); Eric W. Justh, College Park, MD (US); Leonid I. Beresnev, Columbia, MD (US); Perinkulam Krishnaprasad, Glenn Dale, MD (US); Jennifer C. Ricklin, Laurel, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 10/152,564

(22) Filed: May 23, 2002

(51) Int. Cl.$^7$ .................................................. G01J 1/20
(52) U.S. Cl. .................... 250/201.9; 359/245; 359/559; 359/256
(58) Field of Search .................. 250/201.9; 359/238, 359/240, 276, 278, 279, 245, 559–564, 256

(56) References Cited

U.S. PATENT DOCUMENTS

| | | | | |
|---|---|---|---|---|
| 5,276,636 A | * | 1/1994 | Cohn | 708/816 |
| 5,859,728 A | * | 1/1999 | Colin et al. | 359/561 |
| 2002/0027661 A1 | * | 3/2002 | Arieli et al. | 356/512 |

OTHER PUBLICATIONS

Adaptive optics with advanced phase–contrast techniques. I. High–resolution wave–front sensung Mikhail A. Vontsov, Eric W. Justh, Leonid A. Beresnev, vol. 18, No. 6/ Jun. 2001/ J. Opt. Soc. Am. A.

Adaptive optics with advanced phase–contrast techniques. II. High–resolution wave–front control Eric W. Justh, Mikhail A. Vorontsov, Gray W. Carhart, Leonid A. Beresnev P.W. Krishnapasad, vol. 18, No. 6/ Jun. 2001/ J. Opt. Soc. Am. A.

Spatial filtering in nonlinear two–dimensional feedback systems: phase–distortion suppression E. V. Degtiarev, M. A. Vorontsov, vol. 12, No. 7 Jul. 1995 J. Opt. Soc. Am. B.

High–resolution adaptive phase distortion suppression based solely on intensity information V. P. Sivokon, M.A. Vorontsov, vol. 15, No. 1/ Jan. 1998 J. Opt. Soc. Am. A.

Phase retrieval from a set of intensity measurements: theory and experiment V. Yu, Ivanov and V. P. Sivokon, M. A. Vorontsov, vol. 9, No. 9 Sep. 1992 J. Opt. Soc. Am. A.

* cited by examiner

*Primary Examiner*—Thanh X. Luu
*Assistant Examiner*—Stephen Yam
(74) *Attorney, Agent, or Firm*—William V. Adams

(57) ABSTRACT

Systems for optical wavefront sensing and control based on a phase contrast Fourier domain filtering technique. Optically or electronically controlled phase spatial light modulators (SLM) are used as the Fourier domain filter. A direct adaptive-optic feedback system using the optical wavefront sensing systems. A differential Zernike filter is also disclosed.

2 Claims, 4 Drawing Sheets

WAVEFRONT PHASE SENSORS USING OPTICALLY OR ELECTRICALLY CONTROLLED PHASE SPATIAL LIGHT MODULATORS

STATEMENT OF GOVERNMENT INTEREST

The invention described herein may be manufactured and used by or for the Government of the States of America for government purposes without the payment of any royalties therefor.

FIELD OF THE INVENTION

The present invention describes a system for wavefront sensing and control based on phase-contrast techniques using an optically or electronically controlled phase spatial light modulator. It also describes a methodology for wavefront sensing and control using this system.

BACKGROUND OF THE INVENTION

In the prior art, there are many well-known systems and techniques for wavefront sensing and wavefront phase distortion suppression. Typically the resolution of such systems is rather low. However, the situation is rapidly changing with the upcoming new generation of wavefront phase compensation hardware: liquid crystal and micro-electromechanical system (MEMS) phase spatial light modulators (SLMs) having on the order of 104 to 106 elements. Such resolution is difficult to, achieve with traditional wavefront sensors used in adaptive optics: shearing interferometers, Shack-Hartmann sensors, curvature sensors, etc. In these sensors, the wavefront phase must be reconstructed from its first or second derivatives which requires extensive calculations.

Time-consuming calculations are also the principal obstacle for wavefront sensors based on focal plane techniques: phase retrieval from a set of pupil and focal plane intensity distributions, phase diversity, or Schlieren techniques. For these methods, the dependence of the wavefront sensor output intensity (sensor output image) on phase is nonlinear, and phase reconstruction requires the solution of rather complicated inverse problems.

The problem of phase retrieval from high-resolution sensor data can to some degree be overcome by using a recent adaptive optics control paradigm that utilizes the wavefront sensor output image directly without the preliminary phase reconstruction stage. This approach requires high-resolution opto-electronic feedback system architectures. In these systems, a high-resolution wavefront corrector is interfaced with a wavefront sensor output camera, either directly or through opto-electronic hardware performing basic image processing operations in real-time in a parallel, distributed fashion.

High-resolution adaptive-optic wavefront control and wavefront sensing are complementary problems. When compensating phase distortions with an adaptive system, the phase reconstruction problem is automatically solved as compensation results in the formation of a controlling phase matched to an unknown phase aberration (in the condition of perfect correction). From this viewpoint, high-resolution adaptive-optic systems can be considered and used as a parallel optoelectronic computational means for high-resolution wavefront phase reconstruction and analysis.

Although the phase-contrast technique invented by Frits Zernike in 1935 has been considered as a candidate wavefront sensor for adaptive-optic wavefront control in the past, practical limitations of the conventional Zernike filter have prevented its use in practical adaptive-optic systems, The Zernike filter is a well-known Fourier-domain filtering technique in which a glass slide with a fixed phase-shifting dot placed in the focal plane of a lens is used to phase-shift the zero-order spectral component of a monochromatic input beam relative to the rest of the spectrum. The phase-shifted zero-order component of the input beam then serves as a reference beam, which when superimposed with the other component of the input beam yields an intensity distribution which is a nonlinear functional of the input beam wavefront phase distribution.

BRIEF SUMMARY OF INVENTION

This invention describes systems and methods for optical wavefront sensing and control based on a phase-contrast Fourier-domain filtering technique. Wavefront phase sensing is accomplished, using an optically or electronically controlled phase spatial light modulator (SLM) as a Fourier-domain filter. Examples of optically controlled phase SLMs include (1) liquid crystal light valve (LCLV); (2) micro-electromechanical system (MEMS) micromirror array used in conjunction with a photodetector array; and (3) pixelized liquid-crystal device used in conjunction with a photodetector array.

Using a phase SLM, for example instead of the Zernike phase plate discussed above, provides considerable performance improvement including significantly reduced sensitivity to misalignments and wavefront tilts. It has been demonstrated mathematically that the conventional Zernike filter wavefront sensor, as well as the wavefront sensor described here, can be used in high-resolution direct adaptive-optic feedback systems; i.e., feedback systems that can be implemented in a parallel, distributed fashion without the complicated and time-consuming wavefront reconstruction calculations normally used in current adaptive optic wavefront control system architectures.

The direct adaptive optic feedback system approach is capable of high-resolution real-time correction of atmospheric turbulence-induced wavefront phase aberrations. This direct adaptive-optic feedback system approach using the wavefront sensor disclosed here is also encompassed in the present invention. The disclosed wavefront sensors could also be used with conventional low-resolution adaptive-optic wavefront correction hardware based on deformable mirrors or multi-electrode wavefront phase modulators. Another aspect of the present invention is a wavefront sensor identified herein as the "Differential Zernike Filter." This device uses the difference between two intensity measurements corresponding to equal but oppositely-directed zero-order spectral component phase shifts to produce a high visibility wavefront sensor output that is particularly well-suited for use in the direct adaptive optic feedback system.

BRIEF DESCRIPTION OF DRAWING

The invention will be better understood by referring to the accompanying drawings wherein.

DETAILED DESCRIPTION OF PREFERRED EMBODIMENTS

Figure 1:
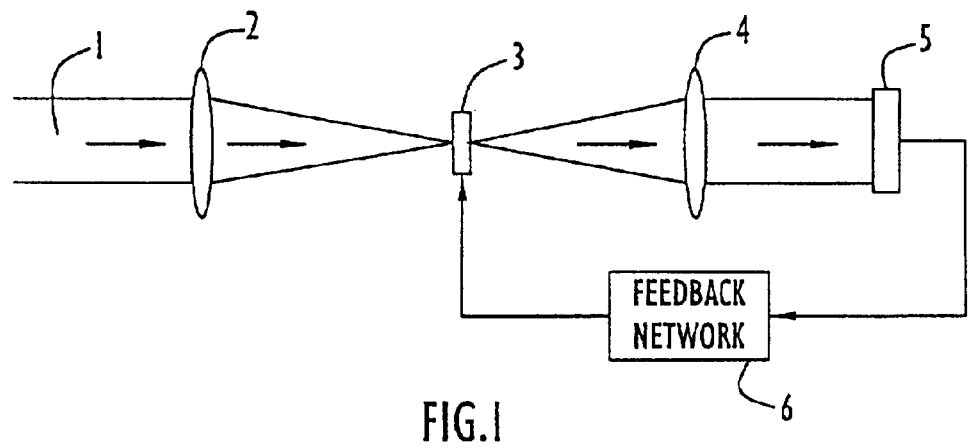
FIG. 1 shows a wavefront sensor based on a liquid-crystal optically controlled phase SLM.

FIG. 1 shows a wavefront sensor based on a liquid crystal (LC) optically controlled phase SLM. A light beam 1 enters the system and is focused by lens 2 onto the LC optically controlled phase SLM 3: The SLM 3 responds to the optical intensity distribution incident upon it by producing a corresponding index of refraction (or birefringence) distribution that affects the light passing through the SLM. Lenses 2 and 4 are used in the usual manner for Fourier-domain filtering with SLM 3 serving as the Fourier-domain filter. The photodetector array 5 measures the output beam intensity distribution. If the SLM has an electrical input that controls its overall optical sensitivity (i.e., slope of the index of refraction change versus incident optical intensity curve) then this electrical input can optionally be adjusted to improve the output image contrast with the electronic feedback network 6 that uses an input signal from the photodetector array 5.

Figure 2:
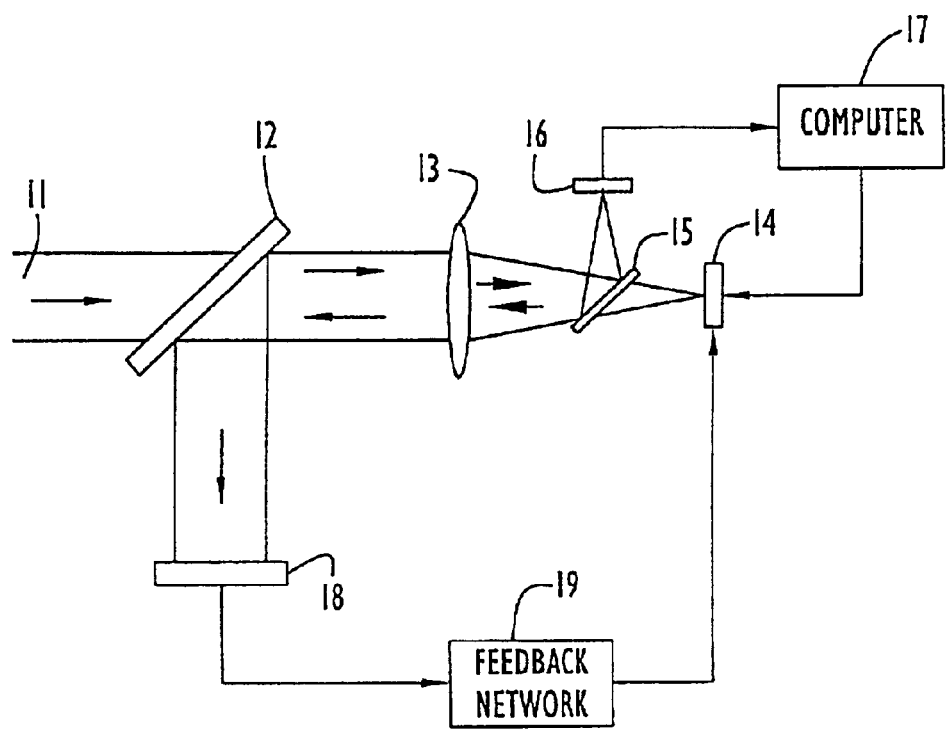
FIG. 2 shows a wavefront sensor based on an electronically controlled phase SLM coupled to a photodetector array in the focal plane.

FIG. 2 shows a wavefront sensor based on an electronically controlled phase SLM coupled to a photodetector array in the focal plane. A light beam 11 enters the system, passes through the beam splitter 12, and is focused by lens 13 onto the electronically controlled phase SLM 14 which is operating in reflective mode. A second beam splitter 15 directs part of the beam to the photodetector array 16 which measures the same intensity distribution as appears at the phase SLM 14. The photodetector array 16, electronic circuitry 17, and phase SLM 14 could be combined into a single device with a photodetector array on one side, phase SLM on the other, and electronic circuitry in between. In such case, extra mirrors would be used to direct the focused beam to the photodetector array. Electronic circuitry 17 (e.g., a computer) determines from the photodetector array signal, a corresponding electronic control signal distribution for driving the phase SLM 14. The SLM 14 responds to its electronic input signal by producing a corresponding index of refraction or birefringence distribution (in the case of a liquid-crystal SLM) or a corresponding optical path length distribution (in the case of a MEMS micromirror SLM). Light reflected back from SLM 14 passes through lens 13 and then is reflected by the beam splitter onto photodetector array 18 where the output beam intensity distribution is measured. As in FIG. 1, the overall response of SLM 14 can optionally be adjusted using electronic feedback circuitry 19 that uses the signal from the photodetector array 18.

Figure 3:
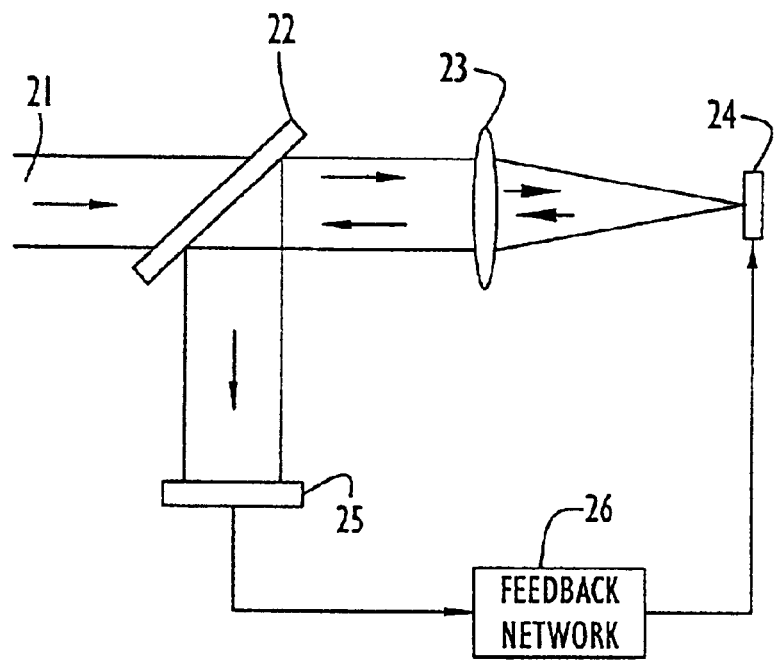
FIG. 3 shows a wavefront sensor based on an optically controlled phase SLM operating in reflective mode.

FIG. 3 shows a wavefront sensor based on an optically controlled phase SLM operating in reflective mode. A light beam 21 enters the system, passes through beam splitter 22, and is focused by lens 23 onto the optically controlled phase SLM 24 operating in reflective mode. The SLM 24 responds to the optical intensity distribution incident upon it by producing a corresponding index of refraction or birefringence distribution (in the case of a liquid crystal SLM), or a corresponding optical path length distribution (in the case of a MEMS micromirror SLM). One possibility for the optically controlled phase SLM is a photodetector array collocated with an electronically controlled phase SLM on the same side of the device, with electronic circuitry also present to compute the appropriate SLM control signals from the measured photodetector signals. Light reflected back from SLM 24 passes through lens 23 and is then reflected by the beam splitter onto photodetector array 25 where the output beam intensity distribution is measured. As in FIG. 1 and FIG. 2 the overall response of SLM 24 can optionally be adjusted using electronic feedback circuitry 26 that uses the signal from the photodetector array 25.

Figure 4:
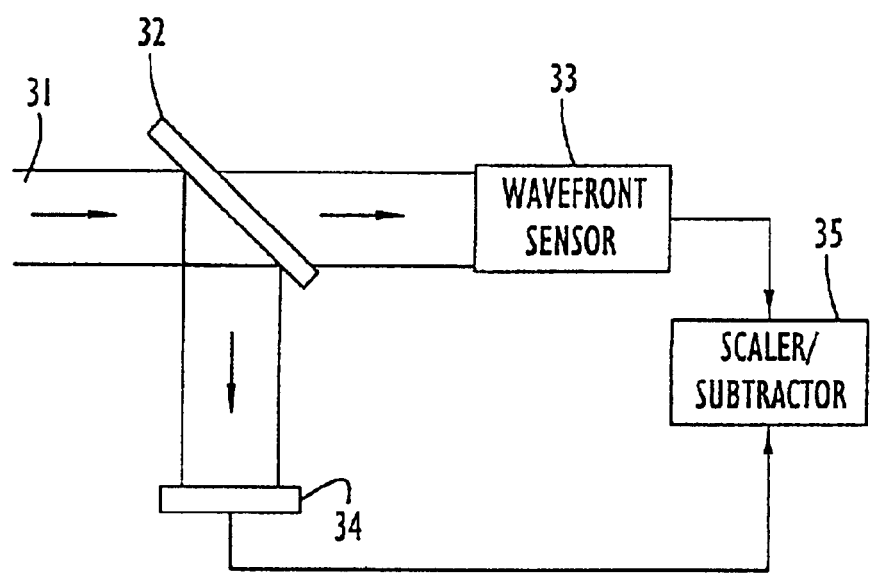
FIG. 4 shows a wavefront sensor of the type depicted in FIGS. 1–3 with the output image improved by subtraction of an image proportional to the input beam intensity distribution.

FIG. 4 shows a wavefront sensor of the type depicted in FIGS. 1–3 with the output image improved by the subtraction of an image proportional to the input beam intensity distribution. The input beam 31 passes through a beam splitter 32 and on to a wavefront sensor 33 of the type depicted in FIGS. 1–3. The intensity of the input beam is measured by photodetector array 34 and this image is scaled and subtracted from the wavefront sensor output image by electronic circuitry 35. The difference image produced by the electronic circuitry 35 is then taken as the wavefront sensor output.

Another method for obtaining the input beam intensity distribution is to use the photodetector array already present in the wavefront sensor of the type depicted in FIGS. 1–3 rather than using a beam splitter and second photodetector array as shown in FIG. 4. If the phase SLM in FIGS. 1–3 can be electronically "turned off" so that no spatially varying phase shift is applied in the Fourier domain, then the intensity measured by the photodetector array [e.g., photodetector array 5 in FIG. 1] is simply the input beam intensity. This technique solves the image registration problem arising in the system of FIG. 4.

Figure 5:
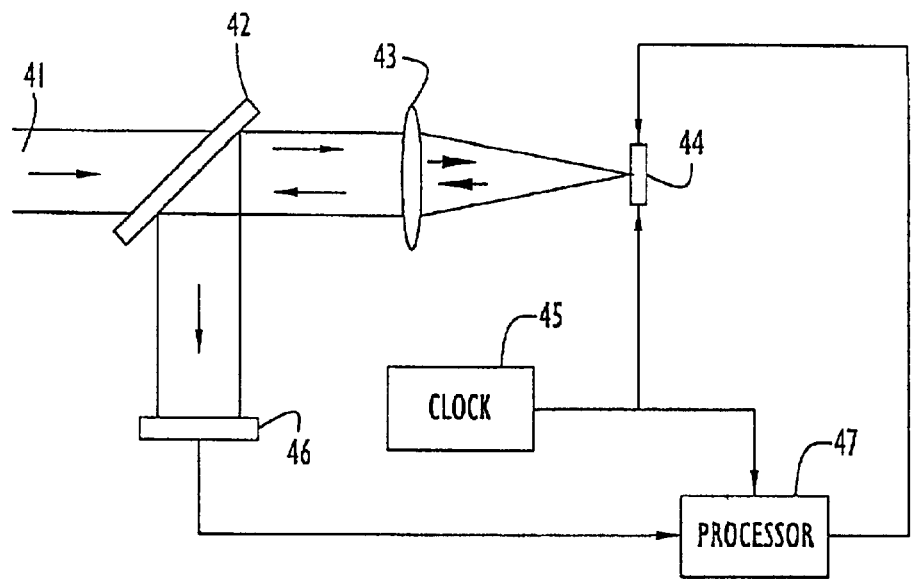
FIG. 5 shows a differential Zernike filter wavefront sensor.

FIG. 5 shows a differential Zernike filter wavefront sensor. A light beam 41 enters the system, passes through beam splitter 42, and is focused by lens 43 onto the phase SLM 44. The SLM 44 has an input from the clock 45. Under control of the signal from clock 45 the optical phase shift supplied by SLM 44 alternates between two distributions so as to approximate a positive phase-shift of the zero-order spectral component relative to the rest of the spectrum followed by an equal but negative phase-shift of the zero-order spectral component relative to the rest of the spectrum. In the simplest form of a differential Zernike filter wavefront sensor the SLM may have only a single active pixel. In this case it is assumed that wavefront tilts have been removed from the input beam 41 prior to where the beam enters the differential Zernike filter wavefront sensor. An optically controlled phase SLM can also be used for SLM 44, as in FIG. 3. Alternatively, an electronically controlled phase SLM with a separate photodetector array and controlling electronics (i.e., components 14, 15, 16 and 17 of FIG. 2) can be used in place of SLM 44 of FIG. 5. Light reflected back from SLM 44 passes through lens 43 and is reflected by the beam splitter onto photodetector array 46 where the output beam intensity distribution is measured. The signal from photodetector array 46 is sent to an electronic processor 47, which also receives the clock signal from clock 45. The electronic processor 47 (e.g., a computer) takes the difference of the output intensity distributions corresponding to alternate clock signals (i.e., alternate polarities of zero-order spectral component phase shifts). The photodetector array 46 and electronic processor 47 may be integrated into a single device. The output of the differential Zernike filter wavefront sensor is the difference signal produced by the electronic processor 47. As in FIGS. 1–3 the overall response of SLM 44 can optionally be adjusted using feedback based upon the signal from the electronic processor 47.

Figure 6:
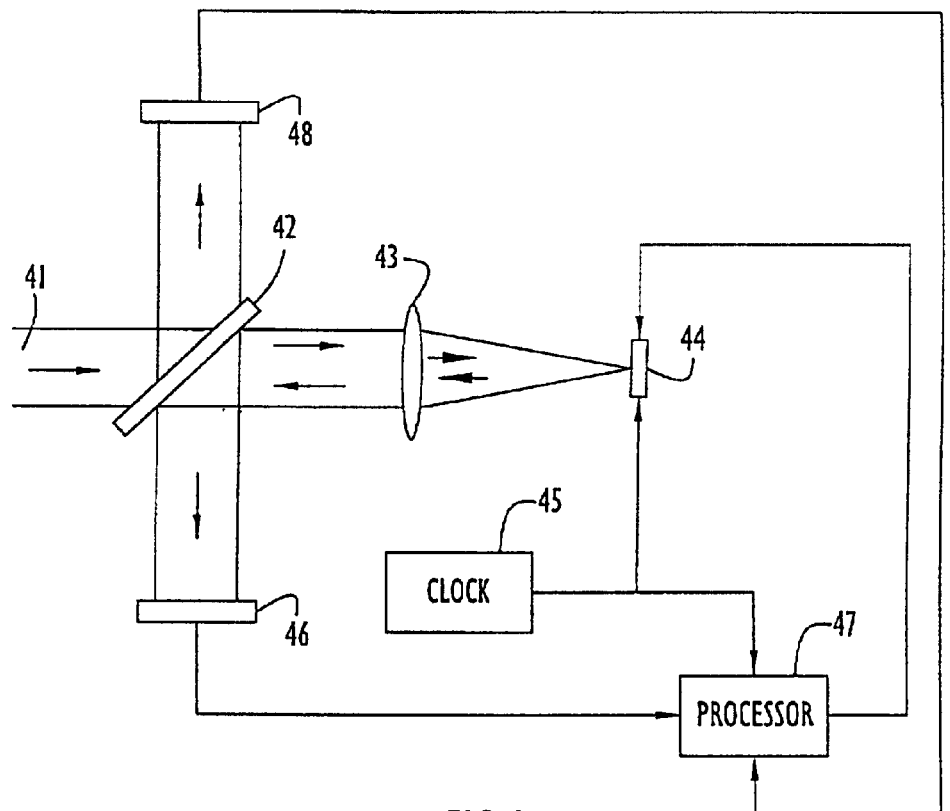
FIG. 6 shows an implementation of the differential Zernike wavefront sensor that corrects for input beam intensity variations.

FIG. 6 shows an embodiment of the differential Zernike wavefront sensor that corrects for input beam intensity variations. All of the elements present in FIG. 5 also appear in FIG. 6. The addition is that photodetector array 48 measures the input beam intensity and sends this measurement to the electronic processor 47. Electronic processor 47 uses the input beam intensity measurement to scale the differenced output beam intensities in order to produce the corrected differential Zernike filter wavefront sensor output.

Another method for obtaining the input beam intensity distribution is to use the photodetector array already present in FIG. 5 rather than a second photodetector array as shown in FIG. 6. If the phase SLM 44 in FIG. 5 can be electronically "turned off" so that no spatially-varying phase shift is applied in the Fourier domain then the intensity measured by photodetector array 46 is simply the input beam intensity. This technique solves the image registration problem arising in the system of FIG. 6.

Figure 7:
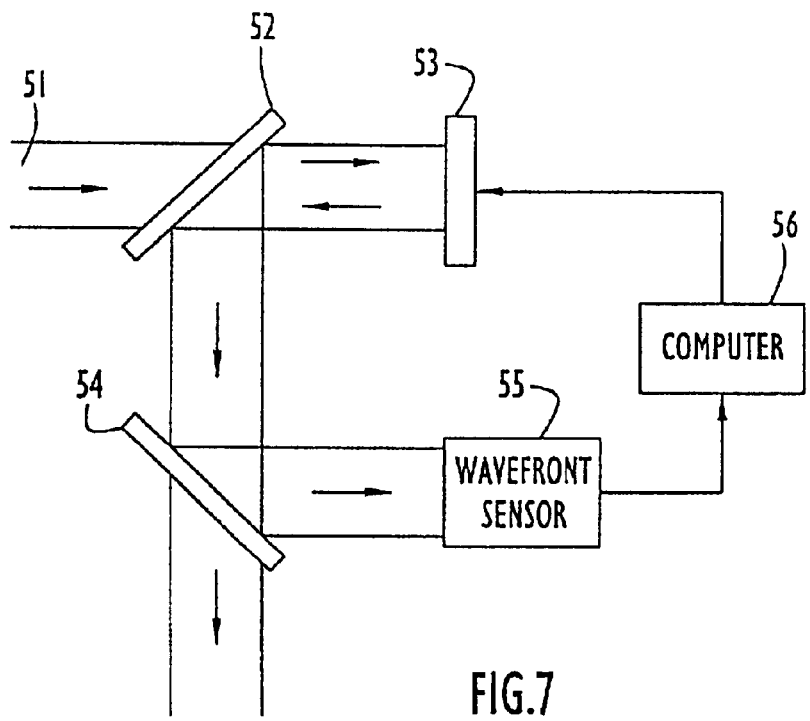
FIG. 7 shows a wavefront control (or adaptive-optic phase distortion suppression) system based on the phase-contrast wavefront sensors described above.

FIG. 7 shows a wavefront control (or adaptive-optic phase distortion suppression) system based on the phase-contrast wavefront sensors described in FIGS. 1–6. Input beam 51 passes through beam splitter 52 and is then modulated by phase SLM 53 operating in reflective mode. In place of the phase SLM 53 a controllable mirror or multi-electrode wavefront phase modulator could be used. The beam reflected from SLM 53 is the output of the wavefront control system and a sample of it is reflected by another beam splitter 54 onto the wavefront sensor 55. The wavefront sensor 55 is any of the wavefront sensors depicted in FIGS. 1–6. The output of the wavefront sensor 55 is processed by electronic circuitry 56 (e.g., a computer), and the output of the electronic circuitry 56 is used as the control input for phase SLM 53. The wavefront-imaging photodetector array of wavefront sensors, electronic circuitry 56, and phase SLM 53 could be integrated into a single device.

Figure 8:
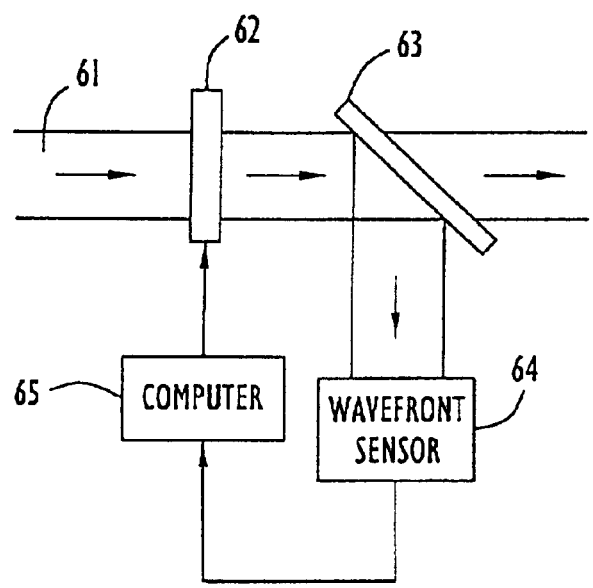
FIG. 8 shows a wavefront control (or adaptive-optic phase distortion suppression) system based on the phase-contrast wavefront sensors described above that uses a phase SLM operating in transmissive mode.

FIG. 8 shows a wavefront control (or adaptive-optic phase distortion suppression) system based on the phase contrast wavefront sensors described in FIGS. 1–6 that uses a phase SLM operating in transmissive mode. In this system input beam 61 passes through phase SLM 62 producing the output beam of the wavefront control system. A beam splitter 63 directs a sample of the wavefront control system output beam into the wavefront sensor 64. Wavefront sensor 64 is any of the wavefront sensors depicted in FIGS. 1–6. The wavefront sensor output signal is then processed by electronic circuitry 65 (e.g., a computer) which produces the control input for the phase SLM 62.

It was recently analytically and numerically demonstrated that the wavefront sensing techniques described here based on optically and electrically controlled phase SLMs can be used to create direct ad adaptive-optic feedback systems with robust convergence properties. Results appear in the following, which are incorporated herein by reference.

[1] M. A. Vorontsov, E. W. Justh, and L. Beresnev, "Adaptive Optics with Advanced Phase-Contrast Techniques: Part I. High-Resolution Wavefront Sensing," *J. Opt. Soc. Am. A.*, Vol. 18, No. 6, June 2001, pp. 1289 to 1299.

[2] E. W. Justh, M. A. Vorontsov, G. W. Carhart, and L. Beresnev, "Adaptive Optics with Advanced Phase-Contrast Techniques: Part II. High-Resolution Wavefront Control," *J. Opt. Soc. Am. A*, Vol. 18, No. 6, June 2001, pp. 1300 to 1311.

[3] E. W. Justh, P. S. Krishnaprasad, and M. A. Vonontsov, "Nonlinear Analysis of a High-Resolution Optical Wavefront Control System," Proc. 39th IEEE Conference on Decision and Control, pp. 3301–3306, IEEE, New York, 2000.

Although described in terms of optical frequencies, the wavefront sensing and control approach described herein also applies to electromagnetic radiation in general (gamma rays, ultraviolet light, visible light, infrared radiation, x-rays, microwaves, etc.), and to particle radiation such as electron radiation. The disclosed wavefront sensor and control system can be used with monochromatic spatially coherent light, or with white light and with both polarized and unpolarized light assuming that conditions for closed loop stability are met.

Also, while the invention has been described in connection with illustrative and preferred embodiments, it should be understood that variations will occur to those skilled in the art, and the invention to be covered is defined in the following claims.

We claim:

1. A wavefront sensor based on a differential Zernike filter comprising:

an optical system for Fourier-domain filtering of an optical input beam to provide a Fourier-transformed beam;

means for sampling the Fourier transformed beam;

means for measuring the intensity of the sample of the Fourier transformed beam;

means for providing a clock signal having electrical pulses;

the optical system including a phase SLM to which the clock signal is applied for supplying equal but oppositely directed phase-shift distributions to the Fourier-transformed beam in response to said electrical pulses of the clock signal, to provide successive output beams having different intensity distributions;

electronic circuitry for computing one or more electronic control input signals to the phase SLM from the intensity measurement of the Fourier transformed beam;

means for measuring the intensity distributions of the output beams, and;

an electronic processor for taking the difference between the different intensity distributions of the successive output means.

2. The wavefront sensor of claim 1 further comprising:

means for controlling the response of the SLM based on the contrast in the output beams.

* * * * *